US012645466B2

(12) United States Patent
Perga et al.

(10) Patent No.: US 12,645,466 B2
(45) Date of Patent: Jun. 2, 2026

(54) BOOTING FROM AN OPERATING SYSTEM (OS) SUBSET

(71) Applicant: Microsoft Technology Licensing, LLC, Redmond, WA (US)

(72) Inventors: Massimo Perga, Snohomish, WA (US); Michael S. Bernstein, Seattle, WA (US); Philippe A. Joubert, Paris (FR); Dragos C. Sambotin, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 18/650,667

(22) Filed: Apr. 30, 2024

(65) Prior Publication Data

US 2025/0272108 A1      Aug. 28, 2025

Related U.S. Application Data

(60) Provisional application No. 63/557,236, filed on Feb. 23, 2024.

(51) Int. Cl.
*G06F 9/4401* (2018.01)
(52) U.S. Cl.
CPC ................................. *G06F 9/4406* (2013.01)
(58) Field of Classification Search
None
See application file for complete search history.

(56) References Cited

U.S. PATENT DOCUMENTS

| | | | | |
|---|---|---|---|---|
| 7,555,642 B2 * | 6/2009 | Gagneraud | ............. | G06F 9/441 |
| | | | | 713/1 |
| 8,522,234 B2 * | 8/2013 | Sareen | ................ | G06F 9/44505 |
| | | | | 717/174 |
| 11,301,217 B1 | 4/2022 | Gezen et al. | | |
| 2003/0023839 A1 * | 1/2003 | Burkhardt | ................. | G06F 8/63 |
| | | | | 713/1 |
| 2013/0111473 A1 * | 5/2013 | Ammons | ............ | G06F 9/45558 |
| | | | | 718/1 |
| 2020/0341743 A1 * | 10/2020 | Gupta | ....................... | G06F 8/61 |

OTHER PUBLICATIONS

Extended European search report received in European Application No. 25158651.7, mailed on Jul. 11, 2025, 9 pages.
"Filter Drivers", Microsoft, retrieved from https://learn.microsoft.com/en-us/windows-hardware/drivers/kernel/filter-drivers, Dec. 15, 2021, 2 pages.

* cited by examiner

*Primary Examiner* — Fahmida Rahman

(57) ABSTRACT

Systems and methods are provided for implementing booting from an operating system ("OS") subset. In various embodiments, an OS management system deploys an OS image to a device, the OS image corresponding to a fully functional OS that is configured to manage hardware and software resources of a computing system on which the fully functional OS is installed. The fully functional OS is partitioned into a plurality of OS subsets corresponding to a plurality of functionalities that the fully functional OS is capable of implementing when the plurality of OS subsets has been initialized. The OS management system receives a user selection indicating selection of a first set of OS subsets among the plurality of OS subsets, and initializes the first set of OS subsets without initializing other OS subsets among the plurality of OS subsets, based on the user selection.

20 Claims, 10 Drawing Sheets

Establish partitioned accounts on the device

432

Enable switching from one of the first partitioned account or the second partitioned account to the other of the first partitioned account or the second partitioned account

434

400C

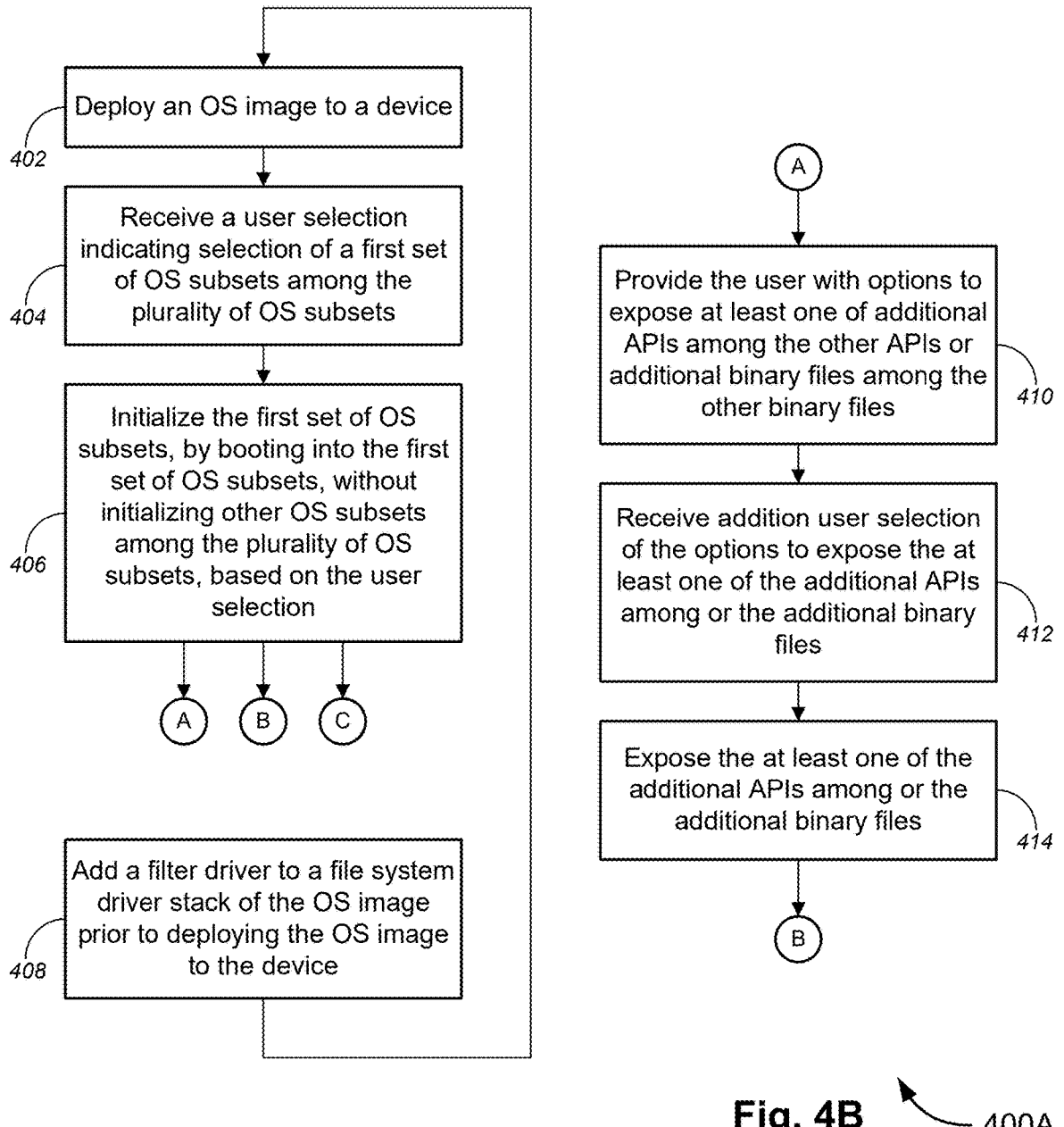

Deploy an OS image to a device

402

Receive a user selection indicating selection of a first set of OS subsets among the plurality of OS subsets

404

Initialize the first set of OS subsets, by booting into the first set of OS subsets, without initializing other OS subsets among the plurality of OS subsets, based on the user selection

406

A    B    C

Add a filter driver to a file system driver stack of the OS image prior to deploying the OS image to the device

408

A

Provide the user with options to expose at least one of additional APIs among the other APIs or additional binary files among the other binary files

410

Receive addition user selection of the options to expose the at least one of the additional APIs among or the additional binary files

412

Expose the at least one of the additional APIs among or the additional binary files

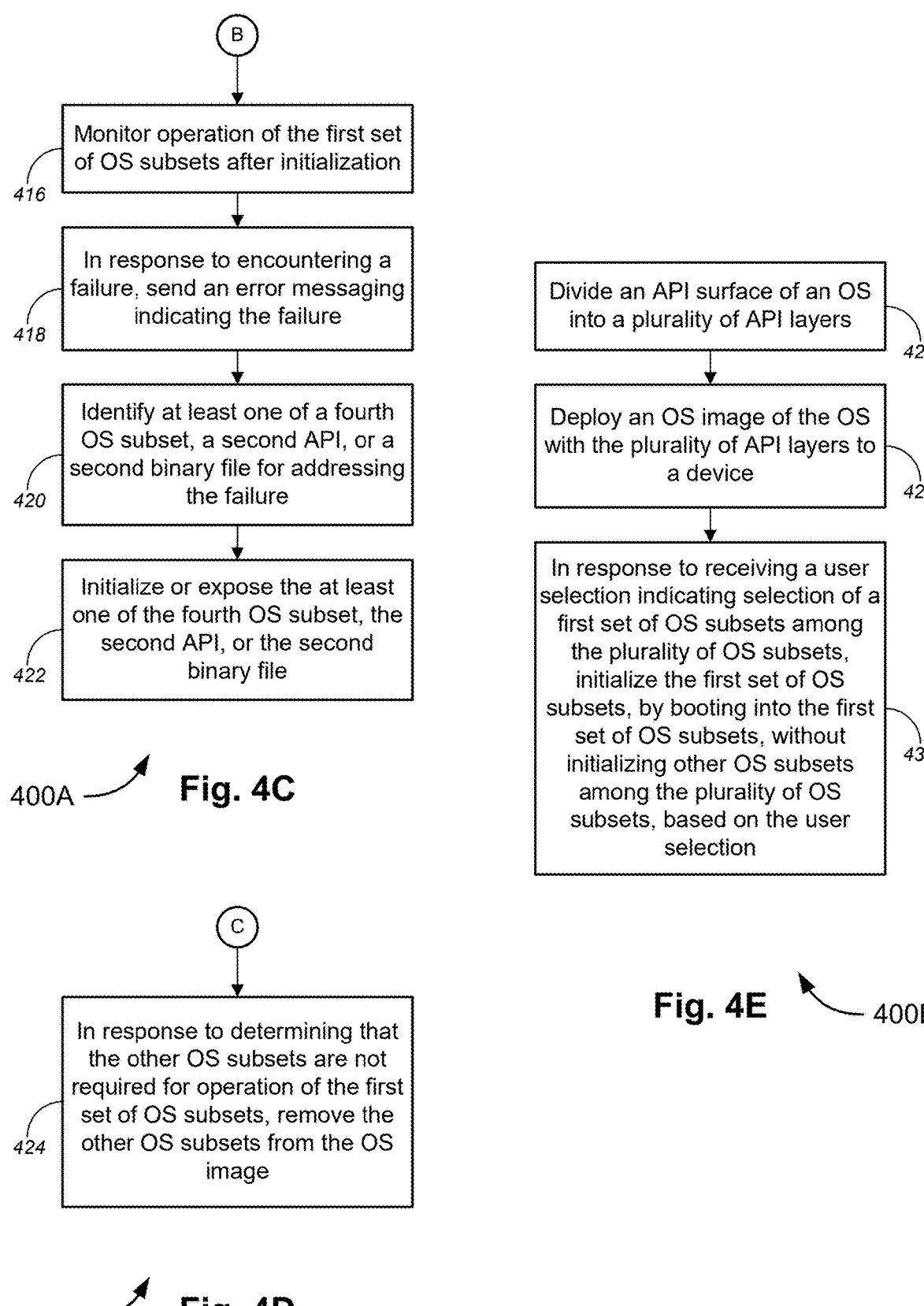

B

Monitor operation of the first set of OS subsets after initialization

416

In response to encountering a failure, send an error messaging indicating the failure

418

Identify at least one of a fourth OS subset, a second API, or a second binary file for addressing the failure

420

Initialize or expose the at least one of the fourth OS subset, the second API, or the second binary file

Divide an API surface of an OS into a plurality of API layers

426

Deploy an OS image of the OS with the plurality of API layers to a device

428

In response to receiving a user selection indicating selection of a first set of OS subsets among the plurality of OS subsets, initialize the first set of OS subsets, by booting into the first set of OS subsets, without initializing other OS subsets among the plurality of OS subsets, based on the user selection

In response to determining that the other OS subsets are not required for operation of the first set of OS subsets, remove the other OS subsets from the OS image

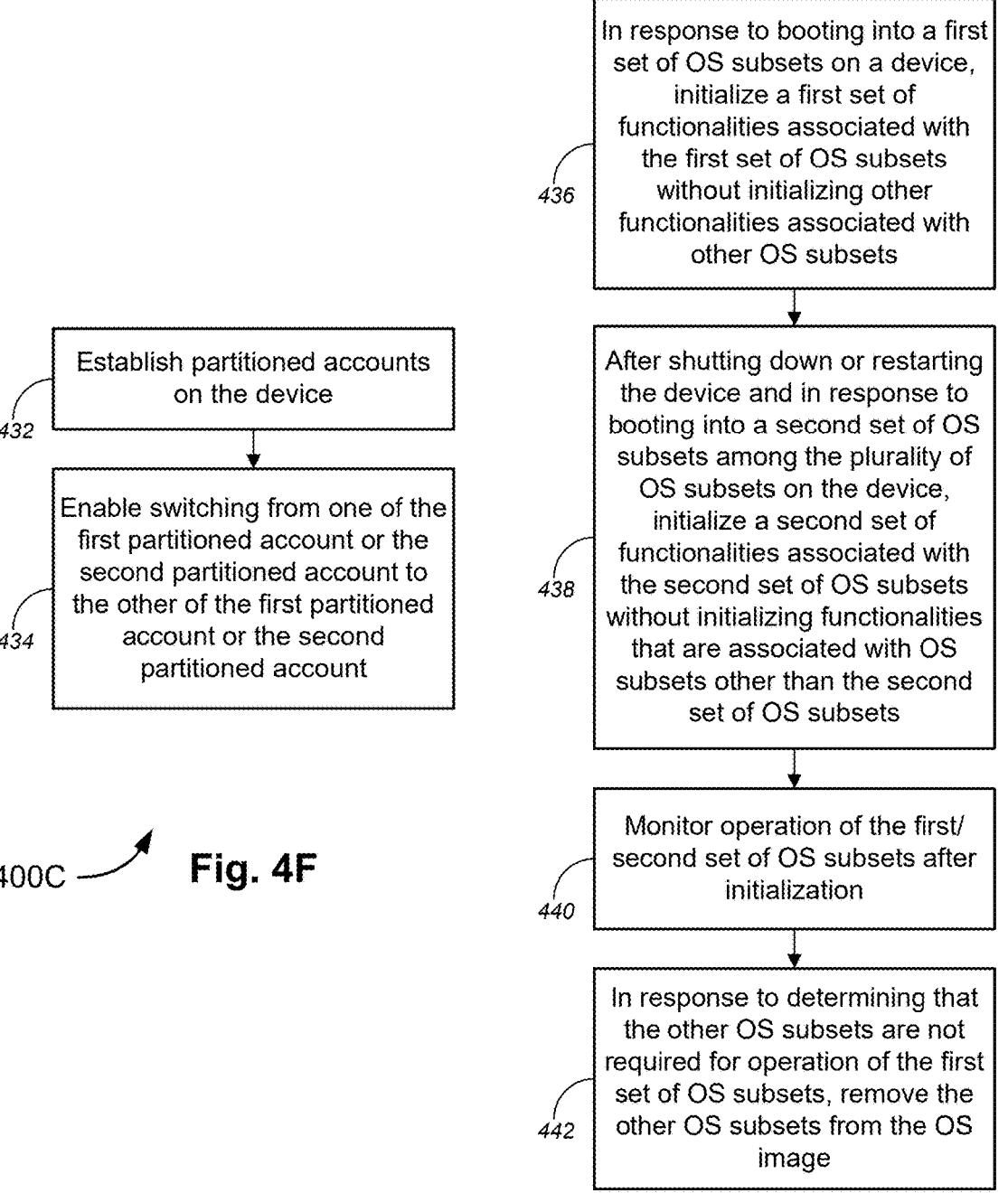

Establish partitioned accounts on the device

432

Enable switching from one of the first partitioned account or the second partitioned account to the other of the first partitioned account or the second partitioned account

In response to booting into a first set of OS subsets on a device, initialize a first set of functionalities associated with the first set of OS subsets without initializing other functionalities associated with other OS subsets

436

After shutting down or restarting the device and in response to booting into a second set of OS subsets among the plurality of OS subsets on the device, initialize a second set of functionalities associated with the second set of OS subsets without initializing functionalities that are associated with OS subsets other than the second set of OS subsets

438

Monitor operation of the first/ second set of OS subsets after initialization

440

In response to determining that the other OS subsets are not required for operation of the first set of OS subsets, remove the other OS subsets from the OS image

COMPUTING DEVICE

SYSTEM MEMORY

OPERATING SYSTEM

505

PROGRAM MODULES

APPLICATIONS

OS
MANAGEMENT
FUNCTION

551

550

506

504

PROCESSING
UNIT

502

508

REMOVABLE
STORAGE

509

NON-REMOVABLE
STORAGE

510

INPUT DEVICE(S)

512

OUTPUT
DEVICE(S)

514

COMMUNICATION
CONNECTIONS

516

500

OTHER
COMPUTING
DEVICES

518

BOOTING FROM AN OPERATING SYSTEM (OS) SUBSET

CROSS-REFERENCES TO RELATED APPLICATIONS

This application claims priority to U.S. Patent Application Ser. No. 63/557,236 (the "'236 Application"), filed Feb. 23, 2024, by Massimo Perga et al., entitled, "Booting from an Operating System (OS) Subset," the disclosure of which is incorporated herein by reference in its entirety for all purposes.

BACKGROUND

Operating systems ("OSs") that are deployed to devices are fully operational OSs, which may be excessive in cases where less than the fully operational OSs are required. In other cases, customizing OSs for deployment to devices with different requirements currently results in myriad different deployment implementations, which is inefficient. It is with respect to this general technical environment to which aspects of the present disclosure are directed. In addition, although relatively specific problems have been discussed, it should be understood that the examples should not be limited to solving the specific problems identified in the background.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for booting from an OS subset, by providing a system administrator with options to choose which subset of an OS a user wants to use from among the OS image. Once the user boots into the chosen OS subset, they will be able to use only functionalities from that OS subset, thus saving computational resources from functionalities that belong to the OS image but are excluded from the OS subset they chose to use. In examples, after booting into the selected logical subset, the operating system will only expose the API belonging to the functionalities inside the logical subset. The operating system will only activate functionalities (e.g., services) included in the logical subset, thus allocating all the computational power to the logical subset.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIGS. 4A-4G depict various example methods for implementing booting from an OS subset.

DETAILED DESCRIPTION OF CERTAIN EMBODIMENTS

An OS can be partitioned into several logical subsets or OS subsets. Each OS subset provides one or more functionalities. An API surface is associated with the OS, and is divided or split into a plurality of API layers each associated with an OS subset. A user can decide from which OS subset to boot instead of booting from an entirety of the OS. The OS operates based on the user selection, the OS exposes only the APIs corresponding to the selected OS subsets, and the OS runs only the services corresponding to the selected OS subsets. In this manner, optimized and customizable experience may be achieved, while system efficiency may be achieved, as well as lower power consumption, faster response, and ease in selecting OS subsets, where system resources may be allocated from unselected OS subsets to the selected OS subsets.

Various modifications and additions can be made to the embodiments discussed without departing from the scope of the disclosed techniques. For example, while the embodiments described above refer to particular features, the scope of the disclosed techniques also includes embodiments having different combinations of features and embodiments that do not include all of the above-described features.

We now turn to the embodiments as illustrated by the drawings. FIGS. 1-5 illustrate some of the features of a method, system, and apparatus for implementing OS functionalities, and, more particularly, to methods, systems, and apparatuses for implementing booting from an OS subset, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

Figure 1:
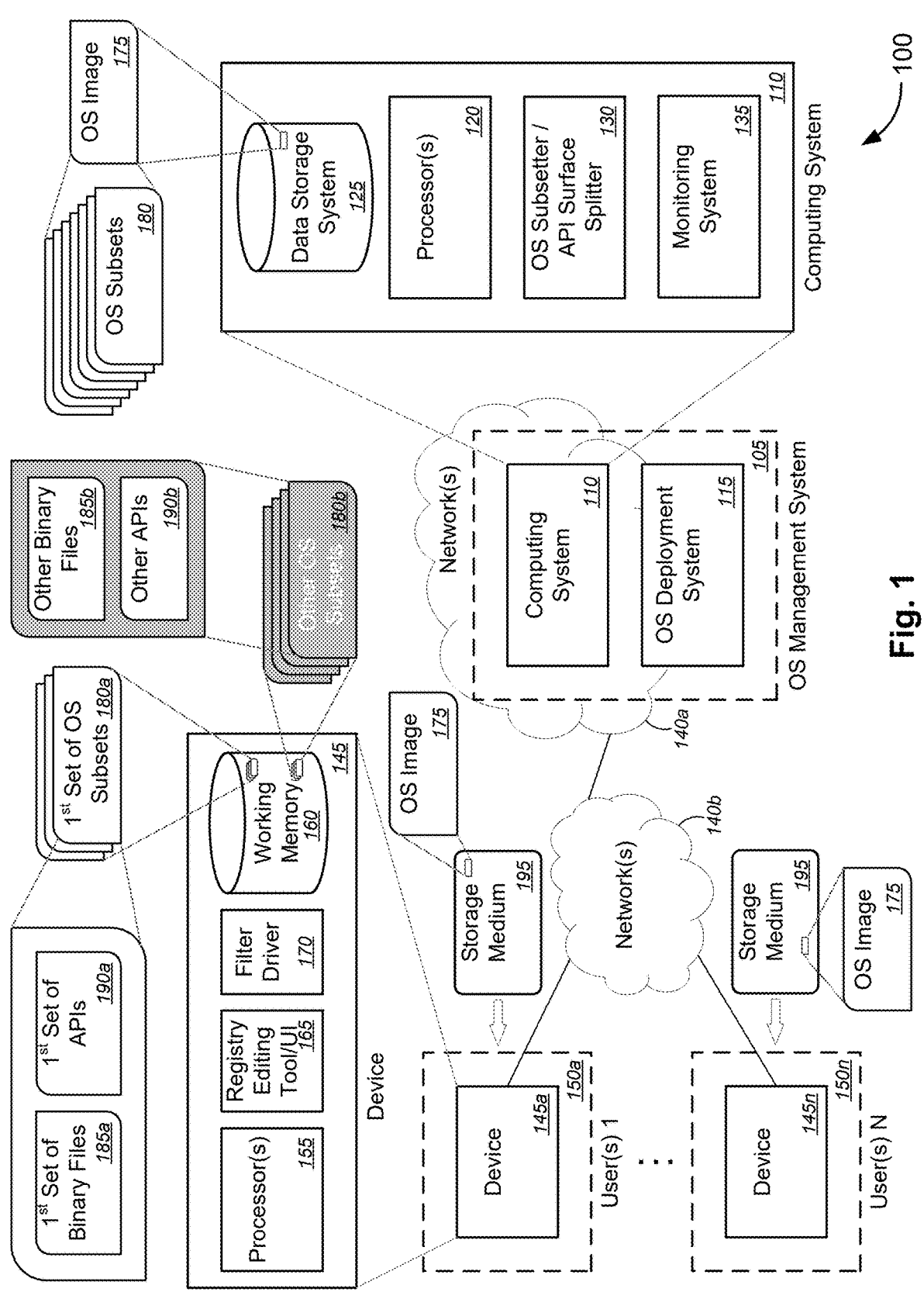
FIG. 1 depicts an example system for implementing booting from an OS subset.

FIG. 1 depicts an example system 100 for implementing booting from an OS subset. System 100 includes OS management system 105, which includes computing system 110 and OS deployment system 115. In examples, the computing system 110 includes processor(s) 120, data storage system 125, OS subsetter or API surface splitter 130, and monitoring system 135. In some examples, the OS management system 105 is located within network(s) 140a. In examples, OS management system 105 communicatively couples with one or more devices 145a-145n (collectively, "devices 145") via network(s) 140b. The one or more devices 145a-145n are associated with users 1 through N 150a-150n (collectively, "users 150"). Herein, n or N is a non-negative integer number. In examples, each device 145 includes a processor (s) 155, a working memory 160, and at least one of a registry editing tool or user interface ("UI") 165 or a filter driver 170.

An OS image 175 of an OS may be stored in data storage system 125 of computing system 110 or OS management system 105. The OS subsetter or API surface splitter 130 divides the OS image 175 into a plurality of OS subsets 180 (such as the OS subsets 210-245 as shown, and described below with respect to, in FIGS. 2A and 2B), each OS subset corresponding to a discrete and fully operational functionality among a plurality of functionalities that the OS is capable of implementing when the plurality of OS subsets has been initialized. Each OS subset is a logical partition or logical subset of the OS. As used herein, "discrete and fully operational functionality" refers to a functionality that is independently operational (i.e., a functionality of one logical partition that is not dependent on other logical partitions or functionalities of the other logical partitions). In some cases, the OS subsetter or API surface splitter 130 divides an API surface corresponding to the OS into a plurality of API layers, each API layer being associated with an OS subset 180. In examples, the OS deployment system 115 deploys the OS image including the plurality of OS subsets 180 and/or the plurality of API layers to a device 145 over network(s) 140a/140b. The registry editing tool or UI 165 provides the user with options to select which OS subsets 180 among the plurality of OS subsets 180 to initialize. Alternatively, the registry editing tool or UI 165 provides the user with options to select which API layers among the plurality of API layers to expose or which binary files among a plurality of binary files corresponding to the plurality of OS subsets or to the plurality of API layers to expose or install. As used herein, an "API layer" may refer to a set of APIs that, when exposed, enables interface with hardware or software components of the device for implementing functionalities (e.g., services) of the OS subset that is associated with the exposed APIs. "Binary files," as used herein, may refer to a computer file that contains non-text data (e.g., binary data), such as a library file (e.g., dynamic link library ("DLL") files), an image file, an executable file, a database file, an archive file, or other non-text file. Filter driver 170, in some cases, may be used to expose the selected OS subsets (e.g., first set of OS subsets 180a), API layers (e.g., first set of APIs 190a), and/or binary files (e.g., first set of binary files 185a), while hiding or filtering out other OS subsets (e.g., other OS subsets 180b), other API layers (e.g., other APIs 190b), and/or other binary files (e.g., other files 185b) among the plurality of OS subsets 180, the plurality of API layers, and the plurality of binary files, respectively. In some examples, system 100 deploys an OS image 175 to a device 145 using a storage medium 195. In some cases, the storage medium 195 includes an optical storage medium (e.g., a compact disc ("CD"), a digital video disc ("DVD"), or Blu-ray disc) or a non-volatile memory storage medium (e.g., flash memory).

Networks 140a and 140b (collectively, "network(s) 140") may each include at least one of a distributed computing network, such as the Internet, a private network, a commercial network, or a cloud network, and/or the like. In examples, each user 150 is one of a service provider technician, a software development and operations ("DevOps") engineer, an operator of the device, an owner of the device, or an end-user. In some examples, each device 145 is one of a special-purpose computing device, a dedicated hardware platform, a functionality-limited computing system, or a computing hardware or software testing platform. In an example, the device 145 is an automated teller machine ("ATM") or other special-purpose computing device, which does not require all the functionalities of the OS (e.g., multimedia functionalities, document processing functionalities, and/or gaming functionalities). In another example, the device 145 is a point-of-purchase device or other dedicated hardware platform, which likewise does not require all the functionalities of the OS (e.g., document processing functionalities and/or gaming functionalities). In yet another example, the device 145 is a user device or other functionality-limited computing system for use by a group of end-users (e.g., students, task-focused employees, or test-takers) whose access is intended to be limited to particular functionalities or intended to limit other functionalities (e.g., administrator functionalities, gaming functionalities, and/or, in some cases, network functionalities). In still another example, the device 145 is a computing hardware or software testing platform that is used for testing portions of hardware or software, in which case selective initialization of OS subsets as described herein is advantageous.

In some cases, the user device includes one of a desktop computer, a laptop computer, a user interface console, a smart phone, or a gaming console. In examples, the plurality of devices 145 may be computing devices that are located in different countries, where each country may require different settings (e.g., language settings, media settings due to compliance with local laws or local intellectual property rights) and the OS includes a first version and a second version. The first version of the OS is an all-encompassing version that includes all functions, settings, and configurations of the OS for world-wide deployment that include common as well as each of the region-specific or function-specific functions, settings, and configurations for each version of the OS that are produced for deployment worldwide. The second version of the OS is a more limited version that is still fully functional, but includes a subset of the functions, settings, and configurations of the all-encompassing version of the OS (e.g., a region-specific version of the OS or a function-specific version of the OS). The device 145 may be any suitable computing device on which the first or the second version of the OS is desired to be implemented. In examples, the OS manages hardware resources on the device and provides services to programs running on the device. Management of the hardware resources generally involves abstraction (e.g., facilitating use of the hardware resource by the programs), sharing, virtualization, and arbitrating access. In some examples, core components of the OS include at least the following for corresponding hardware resources:

Central processing units ("CPUs"): process manager (for creation, deletion, or scheduling) and hypervisor;

Memory: virtual memory manager and program loader;

Disk: file system;

Peripherals: device drivers; and

Cross-resources: power manager.

In examples, services provided by the OS may correspond to the core components and/or additional components of the OS, and include at least one of configuration, access control (in terms of users, privileges, and/or quotas), time, cryptography, inter process communication, networking, debugging, logging, program installation and uninstallation, servicing, gaming, 3D acceleration, virtualization, office productivity, print management, web browsing, entertainment, or multimedia. The lists of the core components and services are merely illustrative and are non-exhaustive.

With OS subsets, rather than a fully functional first or second version of the OS being initialized or installed after deployment of the OS image of the fully functional first or second version of the OS, booting of the device results in booting into the OS subsets, with non-selected OS subsets being hidden or APIs and/or binary files associated therewith not being exposed. In this manner, system efficiency may be achieved, as well as lower power consumption, faster response, and ease in selecting OS subsets, while providing for a single deployment scheme in which the OS (particularly, the first version of the OS) is deployed universally and uniformly on a global basis, with OS subsetting, API splitting, and/or binary file selection being used to subset the OS being deployed in particular regions and in accordance with particular user requirements.

Figure 2A:
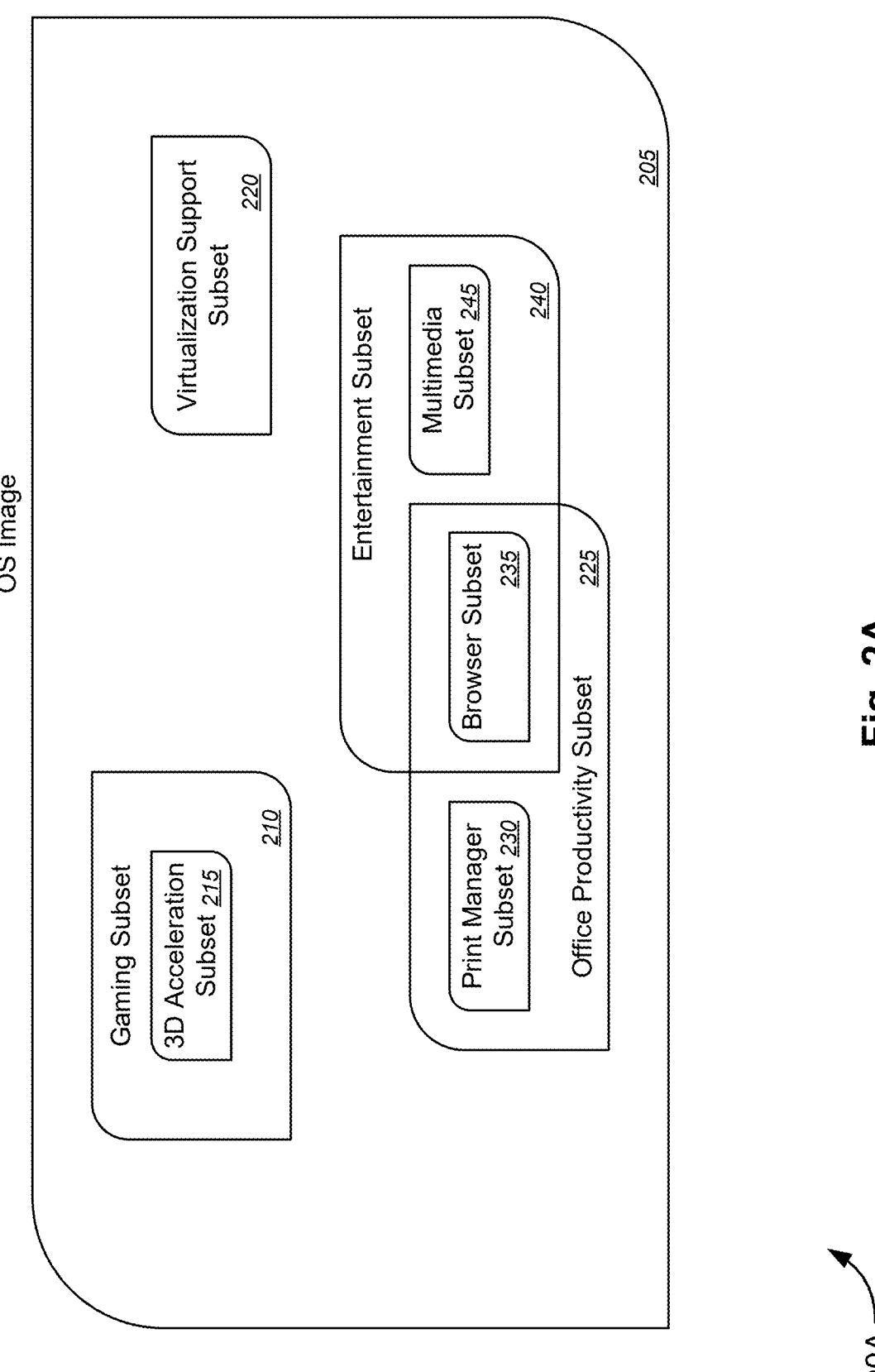
FIG. 2A depicts a diagram illustrating OS subsets and supersets of an OS image that may be used for implementing booting from an OS subset(s).
Figure 2B:
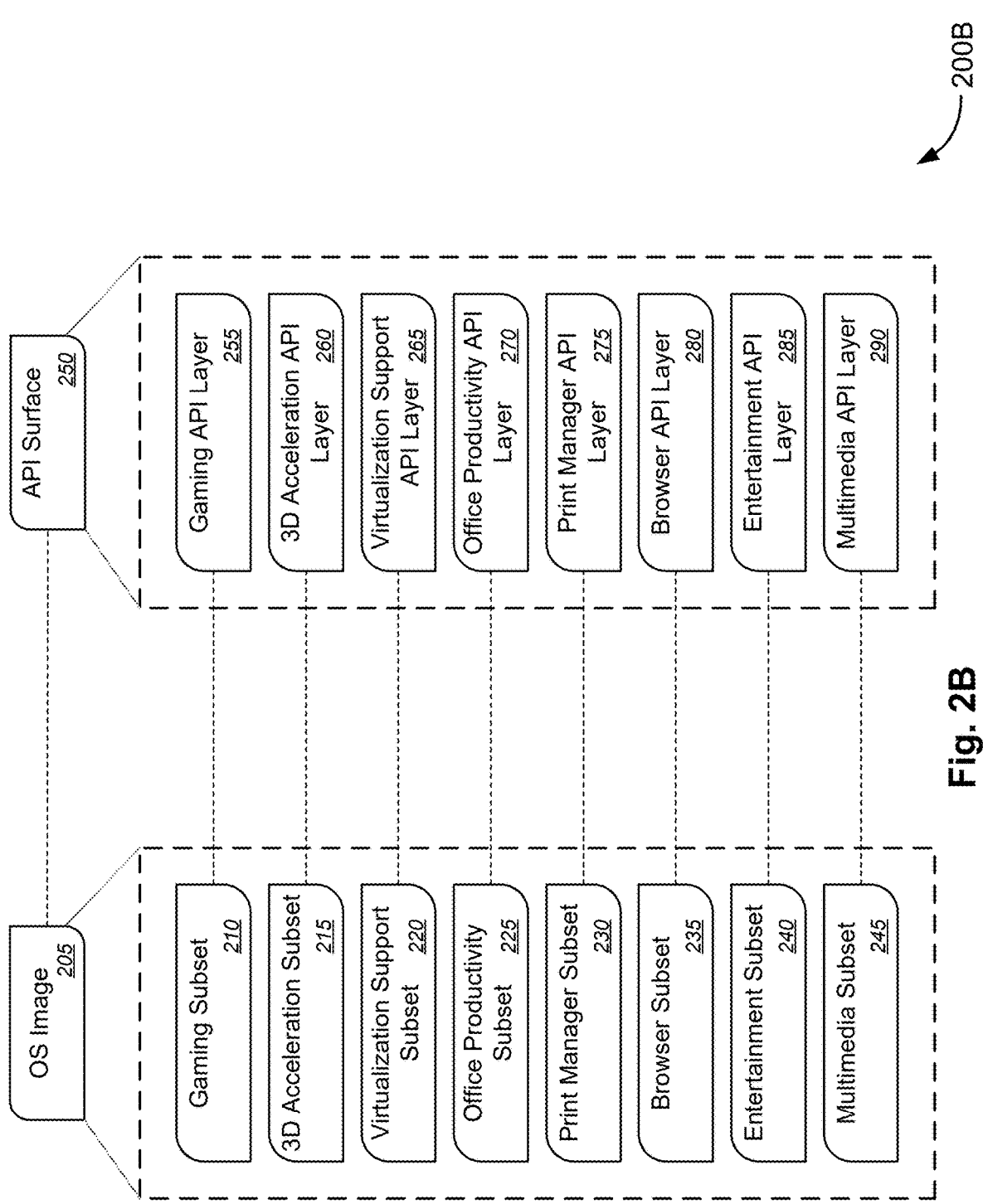
FIG. 2B depicts a diagram illustrating a relationship between an OS image (and its plurality of OS subsets) and an application programming interface ("API") surface (and its plurality of API layers).
Figure 3A:
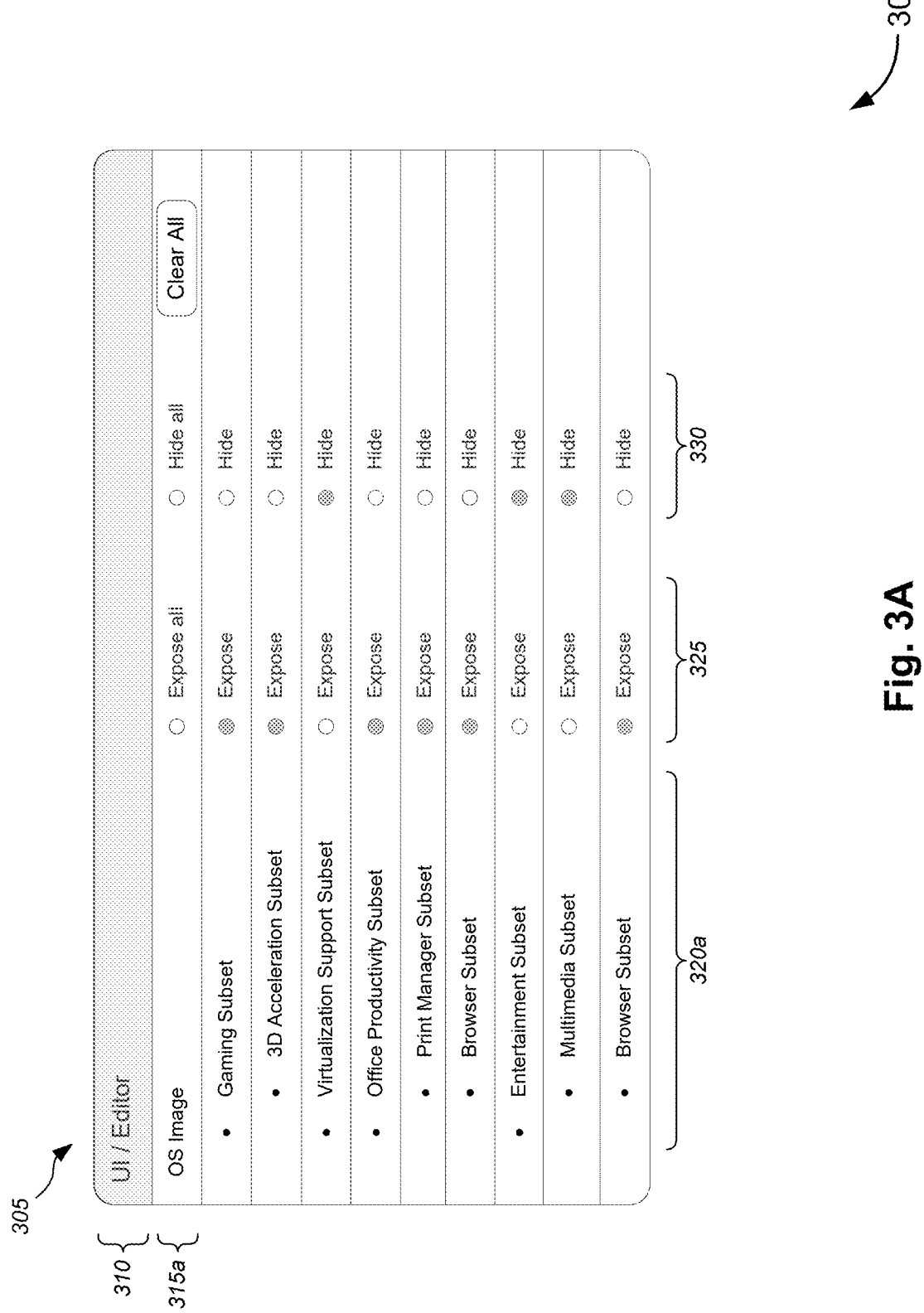
FIGS. 3A-3C depict various example UIs or editors for providing options for user selection of OS subsets, binary files, and/or APIs for implementing booting from OS subset functionalities.
Figure 3B:
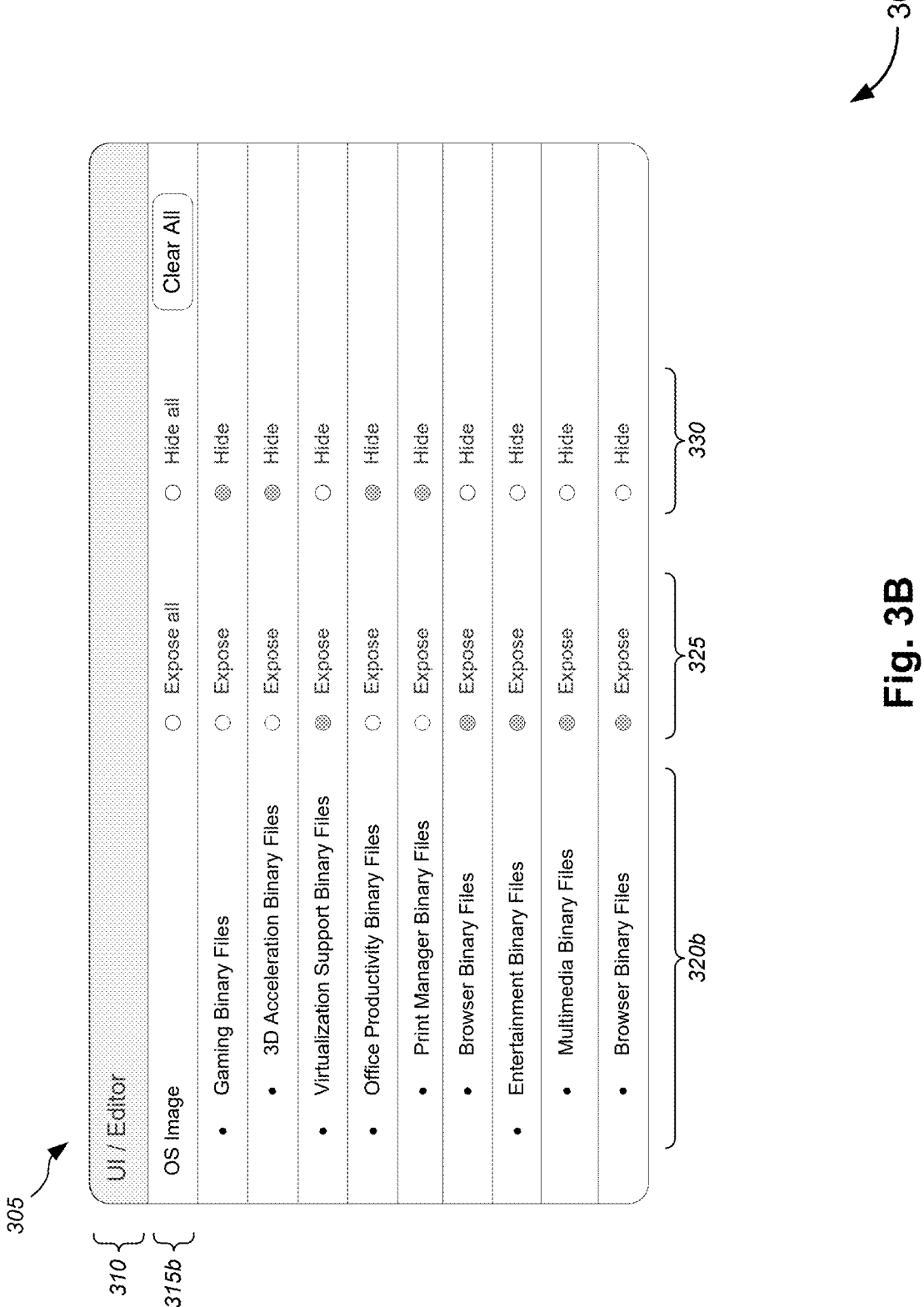
Figure 3C:
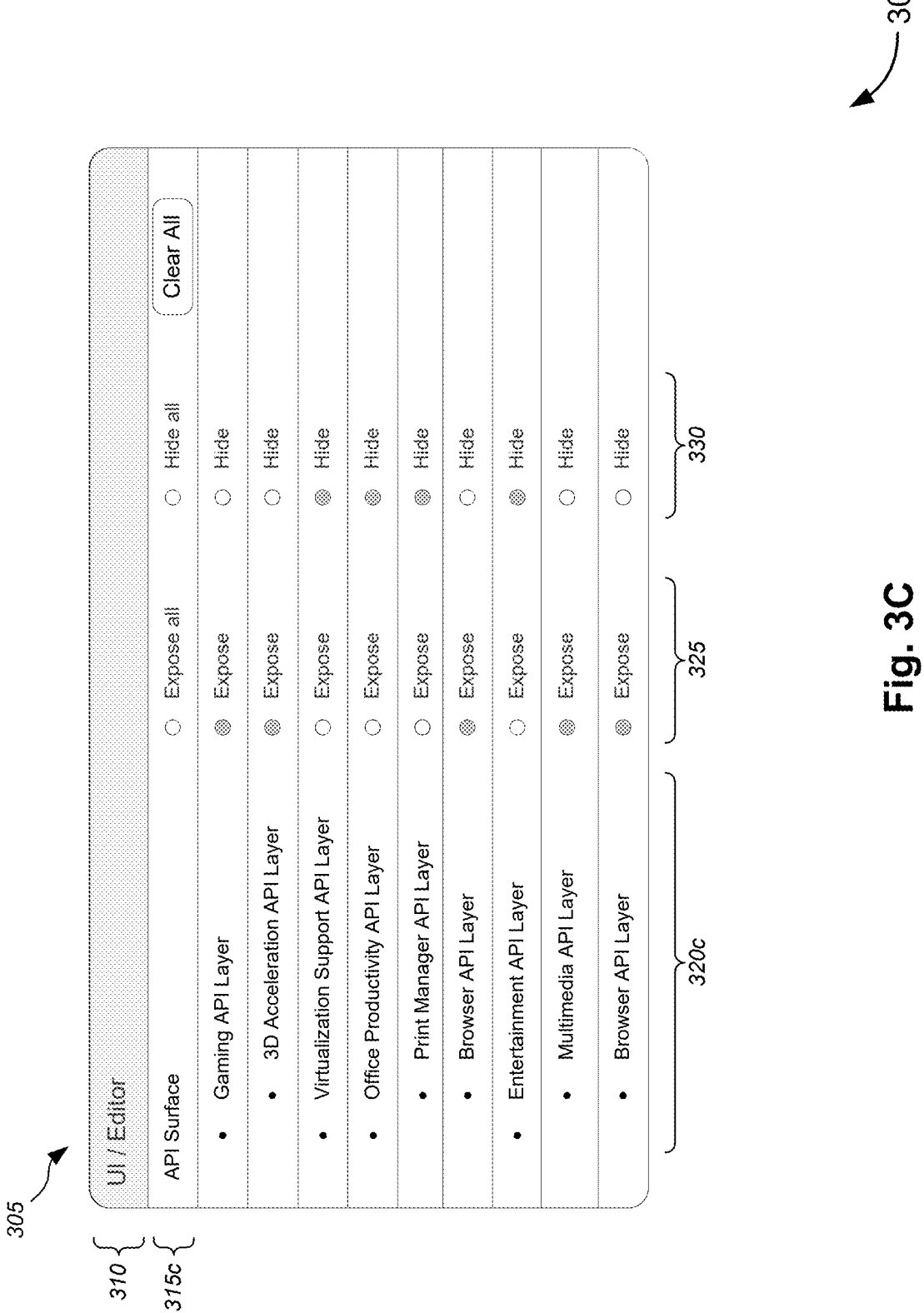

In operation, OS management system 105 and/or computing system 110 may perform methods for implementing booting from an OS subset, as described in detail with respect to FIGS. 2-4. For example, the diagram as described below with respect to FIG. 2A illustrates OS subsets/supersets, while the diagram as described below with respect to FIG. 2B illustrates relationships between OS subsets and API layers. The example UIs or editors as described below with respect to FIGS. 3A-3C illustrate examples for providing options for user selection of OS subsets, binary files, and/or APIs. The example methods 400A-400D as described below with respect to FIGS. 4A-4G may be applied with respect to the operations of system 100 of FIG. 1.

FIG. 2A depicts a diagram illustrating an example 200A of OS subsets and supersets of an OS image that may be used for implementing booting from an OS subset(s). FIG. 2B depicts a diagram illustrating an example 200B of a relationship between an OS image (and its plurality of OS subsets) and an API surface (and its plurality of API layers).

Referring to FIG. 2A, as described herein, an OS image (e.g., OS image 205) may be divided into a plurality of OS subsets. For example, the plurality of OS subsets may include a gaming subset 210, a three-dimensional ("3D") acceleration subset 215, a virtualization support subset 220, an office productivity subset 225, a print manager subset 230, a browser subset 235, an entertainment subset 240, and a multimedia subset 245. These examples are merely illustrative of the types of OS subsets that may be derived from an OS, but are not limited to such. In some examples, an OS subset may be a superset of another OS subset, such as in the case of gaming subset 210 being a superset of the 3D acceleration subset 215, the office productivity subset 225 being a superset of the print manager subset 230 and the browser subset 235, or the entertainment subset being a superset of the multimedia subset 245 and the browser subset 235. Initialization of a superset includes initialization of the OS subsets of the superset. For instance, initializing gaming subset 210 also initializes the 3D acceleration subset 215, in some cases, by exposing APIs or API layers associated with each of the gaming subset 210 and the 3D acceleration subset 215 and/or by exposing or installing binary files associated with each of the gaming subset 210 and the 3D acceleration subset 215.

In some cases, two or more OS subsets may be supersets of a common OS subset, such as the case with office productivity subset 225 and entertainment subset 240 each being a superset of browser subset 235. Initializing either or both of the office productivity subset 225 and the entertainment subset 240 would include initialization of the browser subset 235. However, initializing the office productivity subset 225 (without initializing entertainment subset 240) would not include initializing multimedia subset 245 (which is a subset of entertainment subset 240). Likewise, initializing the entertainment subset 240 (without initializing office productivity subset 225) would not include initializing print manager subset 230 (which is a subset of office productivity subset 225).

Turning to FIG. 2B, the dashed lines represent a relationship between the components connected by the dashed lines. For instance, API surface 250 is related to or is associated with OS image 205. As described above with respect to FIG. 2A, OS image 205 may be divided into a plurality of OS subsets including (in this case) gaming subset 210, 3D acceleration subset 215, virtualization support subset 220, office productivity subset 225, print manager subset 230, browser subset 235, entertainment subset 240, and multimedia subset 245. In a similar manner, API surface 250 may be divided into a plurality of API layers including gaming API layer 255, 3D acceleration API layer 260, virtualization support API layer 265, office productivity API layer 270, print manager API layer 275, browser API layer 280, entertainment API layer 285, and multimedia API layer 290. As denoted by the dashed lines in FIG. 2B, gaming API layer 255, 3D acceleration API layer 260, virtualization support API layer 265, office productivity API layer 270, print manager API layer 275, browser API layer 280, entertainment API layer 285, and multimedia API layer 290 are related to or associated with gaming subset 210, 3D acceleration subset 215, virtualization support subset 220, office productivity subset 225, print manager subset 230, browser subset 235, entertainment subset 240, and multimedia subset 245, respectively.

In aspects, from a file system point of view, an operating system can be abstracted as a collection of files either representing operating system settings or machine executable binary files containing the operating system logic. These files can be grouped into logical subsets, each representing different operating system functionalities. Different strategies can be pursued on how to organize the logical partitions, still delivering well defined behaviors to the users. In some aspects, the API surface may be exposed by an OS binary file, and the API surface may be subsetted using an API redirection mechanism (e.g., API sets).

For example, audio playback is a functionality exposed by the operating system leveraging only a subset of the binaries provided by the operating system. All the files (e.g., binaries or settings) used to achieve audio playback can be considered the logical subset representing the audio playback functionality. Binary files and settings are not bound to a single subset. For instance, files belonging to the audio playback logical subset will also be contained in the video playback logical subset.

FIGS. 3A-3C depict various example UIs or editors 300A-300C for providing options for user selection of OS subsets, binary files, and/or APIs for implementing OS subset booting functionalities. Although FIGS. 3A-3C depict a particular graphical user interface ("GUI") (e.g., UI or editor 305) for providing the user with options to select/deselect OS subsets, binary files, and/or APIs for implementing OS subset booting functionalities, the various embodiments are not so limited, and any suitable UI or GUI may be utilized. In some cases, a text editor, an OS configuration settings editor, or registry editing tool may be used instead of a UI or GUI. As shown in FIGS. 3A-3C, UI or editor 305 includes a header portion (which may include a name or title of the UI, in this case, "UI/Editor"), an OS image/API surface portion 315a-315c, an OS subset portion 320a, a binary file portion 320b, an API layer portion 320c, a selection portion 325 for exposing selected OS subsets/binary files/API layers, and a selection portion 330 for hiding selected OS subsets/binary files/API layers. The selection portions 325 and 330 are mutually exclusive fields where selection to expose a particular OS subset/binary file/API layer will preclude hiding that particular OS subset/binary file/API layer. In some cases, such as shown in FIGS. 3A-3C, an option to "Clear All" may be included to deselect all "Expose" and "Hide" options in the selection portions 325 and 330, respectively. In other cases, an option to select default settings may allow for selecting to "Expose All" or to "Hide All."

With reference to FIG. 3A, the field portion 315a displays "OS Image," with options to "Expose All," "Hide All," or "Clear All." The field portion 320a includes a hierarchical listing of OS subsets and supersets, such as described above with respect to FIG. 2A. For instance, continuing the example from FIGS. 2A and 2B, the OS subsets include gaming subset, 3D acceleration subset, virtualization support subset, office productivity subset, print manager subset, browser subset, entertainment subset, and multimedia subset. The gaming subset is shown to be a superset of the 3D acceleration subset (denoted by the indentation of the 3D acceleration subset under the gaming subset). The office productivity subset is shown to be a superset of each of the print manager subset and the browser subset (denoted by the indentation of the print manager subset and the browser subset under the office productivity subset). The entertainment subset is shown to be a superset of each of the multimedia subset and the browser subset (denoted by the indentation of the multimedia subset and the browser subset under the entertainment subset). Because the browser subset is a subset of each of the office productivity subset and the entertainment subset, the browser subset is listed under each of these OS subsets, where selection to "Expose" or "Hide" the browser subset under one of these supersets is reflected under the other superset. The user may select to "Expose" or "Hide" each of these OS subsets using the options shown in the selection portions 325 and 330.

For example, as shown in FIG. 3A, selection to expose the gaming subset includes automatic selection to expose the 3D acceleration subset. Likewise, selection to expose the office productivity subset includes automatic selection to expose the print manager subset and the browser subset. Although the entertainment subset, which is also a superset of the browser subset, is selected to be hidden, the browser subset under the entertainment subset is also automatically selected to be exposed because it was automatically exposed due to being a subset of the office productivity subset that was selected to be exposed.

Referring to FIG. 3B, rather than the OS subsets being shown under the OS image, the corresponding binary files are listed in binary file portion 320b with the same or similar hierarchies as the OS subsets listed in OS subset portion 320a, and selection to expose a superset binary file(s) (such as gaming binary files, office productivity binary files, and entertainment binary files) results in automatic selection of corresponding subset binary files. In this case, 3D acceleration binary files are a subset of gaming binary files, while print manager binary files are a subset of office productivity binary files, multimedia binary files are a subset of entertainment binary files, and browser binary files are a subset of both office productivity binary files and entertainment binary files. In the example of FIG. 3B, the virtualization support binary files, the entertainment binary files, the multimedia binary files, and the browser binary files (under both the productivity binary files and entertainment binary files) are selected to be exposed, while the other binary files are selected to be hidden.

Turning to FIG. 3C, rather than the OS subsets (of FIG. 3A) or the binary files (of FIG. 3B) being shown under the OS image, API surface corresponding to the OS image is shown in field portion 315c. The corresponding API layers are listed in API layer portion 320c with the same or similar hierarchies as the OS subsets listed in OS subset portion 320a in FIG. 3A or the binary files listed in the binary file portion 320b in FIG. 3B. Selection to expose a superset API layer (such as gaming API layer, office productivity API layer, and entertainment API layer) results in automatic selection of corresponding subset API layer. In this case, 3D acceleration API layer is a subset of gaming API layer, while print manager API layer is a subset of office productivity API layer, multimedia API layer is a subset of entertainment API layer, and browser API layer is a subset of both office productivity API layer and entertainment API layer. In the example of FIG. 3C, the gaming API layer, the 3D acceleration API layer, multimedia API layer, and the browser API layer (under both the productivity API layer and entertainment API layer) are selected to be exposed, while the other API layers are selected to be hidden.

In aspects, the creator of the logical subsets or OS subsets may associate to each of the OS subsets, by selecting an identifier for each desired OS subset, where the identifier for each OS subset is different from the identifiers of all the other logical subsets for the OS image. Alternatively, the creator may provide a definition of the API or API layer that is exposed by an OS subset.

FIGS. 4A-4G depict various example methods 400A-400D for implementing booting from an OS subset. Method 400A of FIG. 4A either continues onto FIG. 4B following the circular marker denoted, "A," continues onto FIG. 4C following the circular marker denoted, "B," or continues onto FIG. 4D following the circular marker denoted, "C." Method 400A continues onto FIG. 4C following the circular marker denoted, "B." Methods 400A (as shown, e.g., in FIGS. 4A-4D), 400B (as shown, e.g., in FIG. 4E), 400C (as shown, e.g., in FIG. 4F), and 400D (as shown, e.g., in FIG. 4G) may be performed by an OS management system (e.g., OS management system 100 of FIG. 1) and/or a computing system (e.g., computing system 110 or processor(s) 155 of FIG. 1). In examples, methods 400A-400D are alternative or additional to each other.

With reference to FIG. 4A, method 400A, at operation 402, includes deploying an OS image to a device, the OS image corresponding to a OS that is configured to manage hardware and software resources of a computing system on which the OS is installed. The OS is partitioned into a plurality of OS subsets corresponding to a plurality of functionalities that the OS is capable of implementing when the plurality of OS subsets has been initialized. At operation 404, method 400A includes receiving a user selection indicating selection of a first set of OS subsets among the plurality of OS subsets. Method 400A further includes, at operation 406, initializing the first set of OS subsets, by booting into the first set of OS subsets, without initializing other OS subsets among the plurality of OS subsets, based on the user selection.

In some examples, deploying the OS image to the device includes one of saving the OS image on the device from an optical storage medium (e.g., a CD, a DVD, or Blu-ray disc), saving the OS image on the device from a non-volatile memory storage medium (e.g., flash memory), or saving the OS image on the device after downloading the OS image over a network from a network storage device (e.g., using OS deployment system 115 of FIG. 1). In some instances, each OS subset corresponds to a discrete and fully operational functionality among the plurality of functionalities. In some cases, the first set of OS subsets includes two or more OS subsets that are associated with different functionalities among the plurality of functionalities. In examples, the first set of OS subsets includes a second OS subset and a third OS subset that is a superset of the second OS subset, where initializing the third OS subset also initializes the second OS subset. In some examples, the device is one of a special-purpose computing device, a dedicated hardware platform, a functionality-limited computing system, or a computing hardware or software testing platform.

In an example, the user selection includes a selection of a first set of functionalities among the plurality of functionalities, the first set of functionalities being associated with the first set of OS subsets; and/or a de-selection of other functionalities among the plurality of functionalities, the other functionalities being associated with the other OS subsets. In another example, the user selection includes a selection of a first set of binary files among a plurality of binary files that is at least in part used by the OS to perform the first set of functionalities; and/or a de-selection of other binary files among the plurality of binary files that is at least in part used by the OS to perform the other functionalities. In yet another example, the user selection includes a selection of a first set of APIs among a plurality of APIs that is associated with at least one of the first set of binary files or the first set of functionalities; and/or a de-selection of other APIs among the plurality of APIs that is associated with at least one of the other binary files or the other functionalities. In examples, the user selection is received via one of a text editor, an OS configuration settings editor, a registry editing tool, or a UI (e.g., registry editing tool/UI 165 of FIG. 1 or UI/Editor 305 of FIGS. 3A-3C).

In an example, initializing the first set of OS subsets without initializing other OS subsets (at operation 406) includes exposing a first set of APIs, without exposing other APIs. The first set of APIs is associated with at least one of the first set of OS subsets, the first set of binary files, or a first set of functionalities associated with the first set of OS subsets or with the first set of binary files. The other APIs are associated with at least one of the other OS subsets, the other binary files, or other functionalities associated with the other OS subsets or with the other binary files. In another example, initializing the first set of OS subsets without initializing other OS subsets (at operation 406) includes installing the first set of OS subsets and establishing the first set of APIs. In yet another example, initializing the first set of OS subsets without initializing other OS subsets (at operation 406) includes selecting to show, using the filter driver, the first set of APIs; and/or hiding the other APIs associated with the at least one of the other OS subsets, the other binary files, or the other functionalities. In still another example, initializing the first set of OS subsets without initializing other OS subsets (at operation 406) includes filtering out, using a filter driver, the other APIs associated with the at least one of the other OS subsets, the other binary files, or the other functionalities.

Alternatively or additionally, in an example, initializing the first set of OS subsets without initializing other OS subsets (at operation 406) includes exposing a first set of binary files associated with the first set of OS subsets without exposing other (non-shared or non-common) binary files associated with the other OS subsets. In another example, initializing the first set of OS subsets without initializing other OS subsets (at operation 406) includes installing the first set of binary files; selecting to show, using the filter driver, the first set of binary files; hiding the other binary files associated with the other OS subsets; and/or filtering out, using the filter driver, the other binary files associated with the other OS subsets.

In examples, method 400A further includes, at operation 408, adding the filter driver to a file system driver stack of the OS image prior to deploying the OS image to the device (at operation 402). In such cases, initializing the first set of OS subsets (at operation 406) includes first installing drivers in the file system driver stack.

Method 400A either may continue onto the process at operation 410 in FIG. 4B following the circular marker denoted, "A," may continue onto the process at operation 416 in FIG. 4C following the circular marker denoted, "B," or may continue onto the process at operation 424 in FIG. 4D following the circular marker denoted, "C."

In some examples, the user selection is received from a user, and the user is one of a service provider technician, a software DevOps engineer, an operator of the device, an owner of the device, or an end-user. Referring to FIG. 4B (following the circular marker denoted, "A," in FIG. 4A), method 400A includes, at operation 410, providing the user with options to expose at least one of additional APIs among the other APIs or additional binary files among the other binary files. Method 400A further includes receiving additional user selection of the options to expose the at least one of the additional APIs or the additional binary files (at operation 412); and exposing the at least one of the additional APIs or the additional binary files (at operation 414). Method 400A may continue onto the process at operation 416 in FIG. 4C following the circular marker denoted, "B."

At operation 416 in FIG. 4C (following the circular marker denoted, "B," in FIG. 4A or the circular marker denoted, "B," in FIG. 4B), method 400A includes monitoring operation of the first set of OS subsets after initialization. At operation 418, method 400A includes, in response to encountering a failure, sending an error message indicating the failure. In examples, the failure includes at least one of a failure to access a necessary API, a failure to load a necessary binary file, or a failure to perform functionalities associated with the first set of OS subsets. Method 400A further includes identifying at least one of a fourth OS subset, a second API, or a second binary file for addressing the failure (at operation 420); and initializing or exposing the at least one of the fourth OS subset, the second API, or the second binary file (at operation 422). Alternatively or additionally, at operation 424 in FIG. 4D (following the circular marker denoted, "C," in FIG. 4A), method 400A includes, in response to determining that the other OS subsets are not required for operation of the first set of OS subsets, removing the other OS subsets from the OS image.

With reference to FIG. 4E, method 400B, at operation 426, includes dividing an API surface of an OS into a plurality of API layers, each API layer being associated with an OS subset of the OS and associated with a discrete and fully operational functionality among a plurality of functionalities of the OS. Method 400B further includes, at operation 428, deploying an OS image of the OS with the plurality of API layers to a device. At operation 430, method 400B includes, in response to receiving a user selection indicating selection of a first set of OS subsets among the plurality of OS subsets, initializing the first set of OS subsets, by booting into the first set of OS subsets, without initializing other OS subsets among the plurality of OS subsets, based on the user selection, by exposing a first set of API layers associated with the first set of OS subsets without exposing other API layers associated with the other OS subsets.

Referring to FIG. 4F, method 400C, at operation 432, includes establishing partitioned accounts on the device, where the first set of OS subsets is initialized on a first partitioned account and a second set of OS subsets is initialized on a second partitioned account. At operation 434, method 400C includes enabling switching from one of the first partitioned account or the second partitioned account to the other of the first partitioned account or the second partitioned account, where functionalities of OS subsets that are not part of the OS subsets of the switched-to partitioned account are hidden, filtered out, or de-initialized.

Turning to FIG. 4G, method 400D, at operation 436, in response to booting into a first set of OS subsets on a device, initializing a first set of functionalities associated with the first set of OS subsets without initializing other functionalities associated with other OS subsets among a plurality of OS subsets from which an OS has been partitioned from an OS image that has been deployed to the device. In some examples, initializing the first set of functionalities (at operation 436) includes exposing at least one of a first set of APIs or a first set of binary files associated with the first set of OS subsets without exposing other APIs or other binary files associated with the other OS subsets. Method 400D further includes, at operation 438, after shutting down or restarting the device and in response to booting into a second set of OS subsets among the plurality of OS subsets on the device, initializing a second set of functionalities associated with the second set of OS subsets without initializing functionalities that are associated with OS subsets other than the second set of OS subsets. In examples, initializing the second set of functionalities (at operation 438) includes exposing at least one of a second set of APIs or a second set of binary files associated with the second set of OS subsets without exposing APIs or binary files associated with the OS subsets other than the second set of OS subsets. At operation 440, method 400D includes monitoring operation of the first set of OS subsets after initialization. Method 400D further includes, in response to determining that the other OS subsets are not required for operation of the first set of OS subsets, removing the other OS subsets from the OS image (at operation 442).

While the techniques and procedures in methods 400A-400D are depicted and/or described in a certain order for purposes of illustration, it should be appreciated that certain procedures may be reordered and/or omitted within the scope of various embodiments. Moreover, while the methods 400A-400D may be implemented by or with (and, in some cases, are described below with respect to) the systems, examples, or embodiments 100, 200A, 200B, 300A, 300B, and 300C of FIGS. 1, 2A, 2B, 3A, 3B, and 3C, respectively (or components thereof), such methods may also be implemented using any suitable hardware (or software) implementation. Similarly, while each of the systems, examples, or embodiments 100, 200A, 200B, 300A, 300B, and 300C of FIGS. 1, 2A, 2B, 3A, 3B, and 3C, respectively (or components thereof), can operate according to the methods 400A-400D (e.g., by executing instructions embodied on a computer readable medium), the systems, examples, or embodiments 100, 200A, 200B, 300A, 300B, and 300C of FIGS. 1, 2A, 2B, 3A, 3B, and 3C can each also operate according to other modes of operation and/or perform other suitable procedures.

As should be appreciated from the foregoing, the present technology provides multiple technical benefits and solutions to technical problems. For example, OS management generally raises multiple technical problems. For instance, one technical problem includes compute resources being allocated to unused services or functionalities among a plurality of functionalities of an OS. In some cases, the unused services are based on constraints on the OS (e.g., local language settings, local media settings, or other settings and services due to compliance with local laws or local intellectual property rights) or based on user access constraints (e.g., for students, task-focused employees, or test-takers). The present technology provides a system administrator with options (e.g., UI, text editor, registry editing tool, or OS configuration settings editor) to choose which subset of an entirety of an OS a user wants to use from among a plurality of subsets in an OS image of the entirety of the OS. Once the user boots into the chosen OS subset, they will be able to use only functionalities from that OS subset, thus saving computational resources from functionalities that belong to the OS image but are excluded from the OS subset they chose to use. In examples, after booting into the selected logical subset, the operating system will only expose the API belonging to the functionalities inside the logical subset. The operating system will only activate functionalities (e.g., services) included in the logical subset, thus allocating all the computational power to the logical subset. In this manner, optimized and customizable experience may be achieved, while system efficiency may be achieved, as well as lower power consumption, faster response, and ease in selecting OS subsets, where system resources may be allocated from unselected OS subsets to the selected OS subsets.

Figure 5:
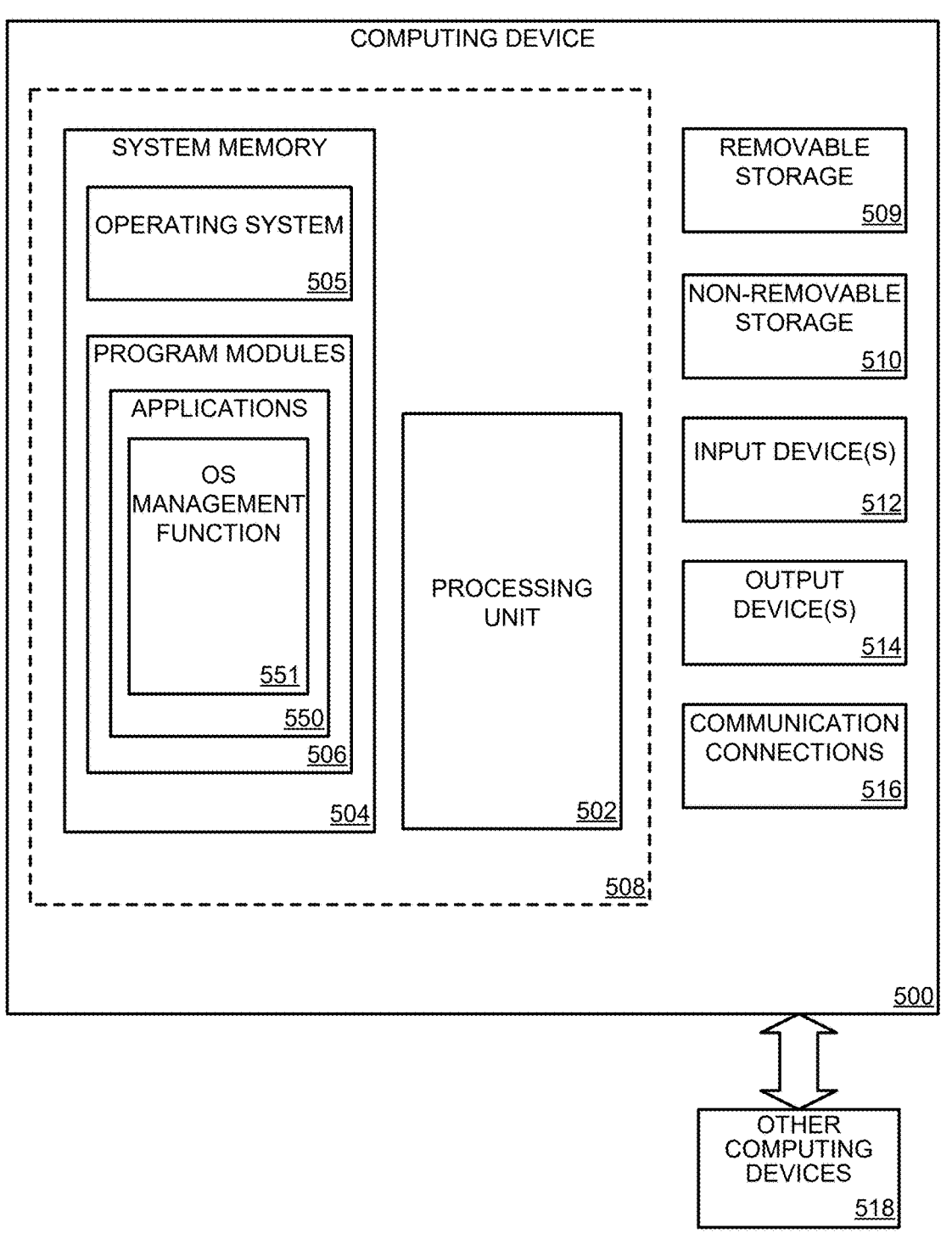
FIG. 5 depict a block diagram illustrating example physical components of a computing device with which aspects of the technology may be practiced.

FIG. 5 depicts a block diagram illustrating physical components (i.e., hardware) of a computing device 500 with which examples of the present disclosure may be practiced. The computing device components described below may be suitable for a client device implementing the booting from an OS subset(s), as discussed above. In a basic configuration, the computing device 500 may include at least one processing unit 502 and a system memory 504. The processing unit(s) (e.g., processors) may be referred to as a processing system. Depending on the configuration and type of computing device, the system memory 504 may include volatile storage (e.g., random access memory), non-volatile storage (e.g., read-only memory), flash memory, or any combination of such memories. The system memory 504 may include an operating system 505 and one or more program modules 506 suitable for running software applications 550, such as OS management function 551, to implement one or more of the systems or methods described above.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionalities. For example, the computing device 500 may also include additional data storage devices (which may be removable and/or non-removable), such as, for example, magnetic disks, optical disks, or tape. Such additional storage is illustrated in FIG. 5 by a removable storage device(s) 509 and a non-removable storage device(s) 510.

As stated above, a number of program modules and data files may be stored in the system memory 504. While executing on the processing unit 502, the program modules 506 may perform processes including one or more of the operations of the method(s) as illustrated in FIGS. 4A-4G, or one or more operations of the system(s) and/or apparatus(es) as described with respect to FIGS. 1-3C, or the like. Other program modules that may be used in accordance with examples of the present disclosure may include applications such as electronic mail and contacts applications, word processing applications, spreadsheet applications, database applications, slide presentation applications, drawing or computer-aided application programs, and/or artificial intelligence ("AI") applications and machine learning ("ML") modules on cloud-based systems.

Furthermore, examples of the present disclosure may be practiced in an electrical circuit including discrete electronic elements, packaged or integrated electronic chips containing logic gates, a circuit utilizing a microprocessor, or on a single chip containing electronic elements or microprocessors. For example, examples of the present disclosure may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (or chip). Examples of the present disclosure may also be practiced using other technologies capable of performing logical operations such as, for example, AND, OR, and NOT, including mechanical, optical, fluidic, and/or quantum technologies.

The computing device 500 may also have one or more input devices 512 such as a keyboard, a mouse, a pen, a sound input device, and/or a touch input device. The output device(s) 514, such as a display, speakers, and/or a printer, may also be included. The aforementioned devices are examples and others may be used. The computing device 500 may include one or more communication connections 516 allowing communications with other computing devices 518. Examples of suitable communication connections 516 include radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 504, the removable storage device 509, and the non-removable storage device 510 are all computer storage media examples (i.e., memory storage). Computer storage media may include random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible, and computer storage media do not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, communication media may include wired media such as a wired network or direct-wired connection, and wireless media such as acoustic, RF, infrared, and other wireless media.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

What is claimed is:

1. A system, comprising:
a processor; and
memory storing an operating system ("OS") management system and comprising computer executable instructions that, when executed by the processor, cause the OS management system to perform operations comprising:
establishing a first partitioned account and a second partitioned account on a device, wherein an OS of the device is partitioned into a plurality of OS subsets corresponding to a plurality of functionalities that the OS is capable of implementing when the plurality of OS subsets has been initialized, and wherein a first set of OS subsets among the plurality of OS subsets is initialized on the first partitioned account and a second set of OS subsets among the plurality of OS subsets is initialized on the second partitioned account;
enabling switching from one of the first partitioned account or the second partitioned account to the other of the first partitioned account or the second partitioned account, where functionalities of OS subsets that are not part of the OS subsets of the switched-to partitioned account are hidden, filtered out, or de-initialized;
deploying an OS image to the device, the OS image corresponding to the OS, wherein the OS is configured to manage hardware and software resources of a computing system on which the OS is installed;
receiving a user selection indicating selection of the first set of OS subsets; and
initializing the first set of OS subsets, by booting into the first set of OS subsets, without initializing other OS subsets among the plurality of OS subsets, based on the user selection.

2. The system of claim 1, wherein deploying the OS image to the device comprises one of saving the OS image on the device from an optical storage medium, saving the OS image on the device from a non-volatile memory storage medium, or saving the OS image on the device after downloading the OS image over a network from a network storage device.

3. The system of claim 1, wherein each OS subset corresponds to a discrete and fully operational functionality among the plurality of functionalities.

4. The system of claim 1, wherein the first set of OS subsets comprises two or more OS subsets that are associated with different functionalities among the plurality of functionalities.

5. The system of claim 4, wherein the first set of OS subsets comprises a second OS subset and a third OS subset that is a superset of the second OS subset, wherein the operations further comprise:
initializing the third OS subset;
wherein initializing the third OS subset also initializes the second OS subset.

6. The system of claim 1, wherein the device is one of a special-purpose computing device, a dedicated hardware platform, a functionality-limited computing system, or a computing hardware or software testing platform.

7. The system of claim 1, wherein the user selection includes at least one of:
a selection of a first set of functionalities among the plurality of functionalities, the first set of functionalities being associated with the first set of OS subsets;
a de-selection of other functionalities among the plurality of functionalities, the other functionalities being associated with the other OS subsets;
a selection of a first set of binary files among a plurality of binary files that is at least in part used by the OS to perform the first set of functionalities;
a de-selection of other binary files among the plurality of binary files that is at least in part used by the OS to perform the other functionalities;
a selection of a first set of application programming interfaces ("APIs") among a plurality of APIs that is associated with at least one of the first set of binary files or the first set of functionalities; or
a de-selection of other APIs among the plurality of APIs that is associated with at least one of the other binary files or the other functionalities.

8. The system of claim 7, wherein the user selection is received via one of a text editor, an OS configuration settings editor, a registry editing tool, or a user interface ("UI").

9. The system of claim 7, wherein the user selection is received from a user, and wherein the user is one of a service provider technician, a software development and operations ("DevOps") engineer, an operator of the device, an owner of the device, or an end-user.

10. The system of claim 9, wherein the operations further comprise, after initializing the first set of OS subsets:

providing the user with options to expose at least one of additional APIs among the other APIs or additional binary files among the other binary files; and in response to receiving additional user selection of the options to expose the at least one of the additional APIs among or the additional binary files, exposing the at least one of the additional APIs among or the additional binary files.

11. The system of claim 1, wherein initializing the first set of OS subsets without initializing other OS subsets comprises at least one of:

exposing a first set of APIs associated with at least one of the first set of OS subsets, the first set of binary files, or a first set of functionalities associated with the first set of OS subsets or with the first set of binary files, without exposing other APIs associated with at least one of the other OS subsets, the other binary files, or other functionalities associated with the other OS subsets or with the other binary files;

installing the first set of OS subsets and establishing the first set of APIs;

selecting to show, using a filter driver, the first set of APIs;

hiding the other APIs associated with the at least one of the other OS subsets, the other binary files, or the other functionalities;

filtering out, using a filter driver, the other APIs associated with the at least one of the other OS subsets, the other binary files, or the other functionalities;

exposing a first set of binary files associated with the first set of OS subsets without exposing other binary files associated with the other OS subsets;

installing the first set of binary files;

selecting to show, using the filter driver, the first set of binary files;

hiding the other binary files associated with the other OS subsets; or filtering out, using the filter driver, the other binary files associated with the other OS subsets.

12. The system of claim 11, wherein the operations further comprise:

adding the filter driver to a file system driver stack of the OS image prior to deploying the OS image to the device;

wherein initializing the first set of OS subsets includes first installing drivers in the file system driver stack.

13. The system of claim 1, wherein the operations further comprise:

in response to determining that the other OS subsets are not required for operation of the first set of OS subsets, removing the other OS subsets from the OS image.

14. The system of claim 1, wherein the operations further comprise:

monitoring operation of the first set of OS subsets after initialization; and in response to encountering a failure, sending an error message indicating the failure, wherein the failure includes at least one of a failure to access a necessary API, a failure to load a necessary binary file, or a failure to perform functionalities associated with the first set of OS subsets.

15. The system of claim 14, wherein the operations further comprise:

identifying at least one of a fourth OS subset, a second API, or a second binary file for addressing the failure; and initializing or exposing the at least one of the fourth OS subset, the second API, or the second binary file.

16. A method, comprising:

establishing a first partitioned account and a second partitioned account on a device, wherein an operating system (OS) of the device is partitioned into a plurality of OS subsets corresponding to a plurality of functionalities that the OS is capable of implementing when the plurality of OS subsets has been initialized, and wherein a first set of OS subsets among the plurality of OS subsets is initialized on the first partitioned account and a second set of OS subsets among the plurality of OS subsets is initialized on the second partitioned account;

enabling switching from one of the first partitioned account or the second partitioned account to the other of the first partitioned account or the second partitioned account, where functionalities of OS subsets that are not part of the OS subsets of the switched-to partitioned account are hidden, filtered out, or de-initialized;

deploying an OS image to the device, the OS image corresponding to the OS, wherein the OS is configured to manage hardware and software resources of a computing system on which the OS is installed;

receiving a user selection indicating selection of the first set of OS subsets; and initializing the first set of OS subsets, by booting into the first set of OS subsets, without initializing other OS subsets among the plurality of OS subsets, according to the received user selection.

17. The method of claim 16, wherein deploying the OS image to the device comprises one of saving the OS image on the device from an optical storage medium, saving the OS image on the device from a non-volatile memory storage medium, or saving the OS image on the device after downloading the OS image over a network from a network storage device.

18. The method of claim 16, wherein each OS subset corresponds to a discrete and fully operational functionality among the plurality of functionalities.

19. The method of claim 16, wherein the first set of OS subsets comprises two or more OS subsets that are associated with different functionalities among the plurality of functionalities.

20. A system, comprising:

a processor; and memory storing an operating system ("OS") management system comprising computer executable instructions that, when executed by the processor, cause the OS management system to perform operations comprising:

dividing an application programming interface ("API") surface of an OS into a plurality of API layers, each API layer being associated with an OS subset of the OS and associated with a discrete and fully operational functionality among a plurality of functionalities of the OS;

deploying an OS image of the OS with the plurality of API layers to a device; and in response to receiving a user selection indicating selection of a first set of OS subsets among a plurality of OS subsets, initializing the first set of OS subsets, by booting into the first set of OS subsets, without initializing other OS subsets among the plurality of OS subsets, based on the user selection, by exposing a first set of API layers associated with the first set of OS subsets without exposing other API layers associated with the other OS subsets.

* * * * *